UNITED STATES PATENT OFFICE.

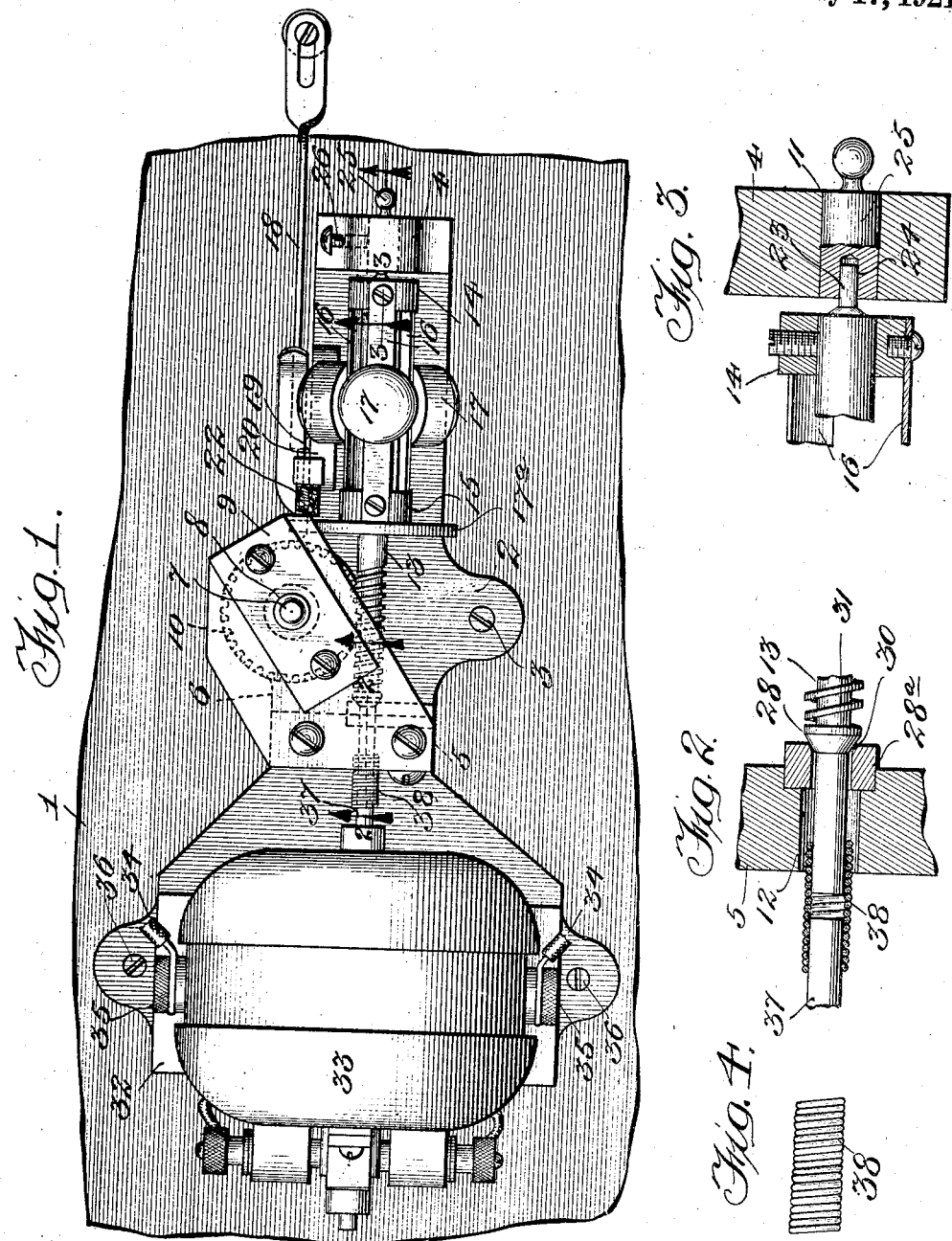

GEORGE C. TROTTER, OF CHICAGO, ILLINOIS, ASSIGNOR TO PLYMOUTH PHONOGRAPH PARTS CO., OF PLYMOUTH, WISCONSIN, A CORPORATION OF WISCONSIN.

MOTOR.

1,378,153. Specification of Letters Patent. Patented May 17, 1921.

Application filed October 20, 1919, Serial No. 332,030. Renewed March 2, 1921. Serial No. 449,240.

*To all whom it may concern:*

Be it known that I, GEORGE C. TROTTER, a citizen of the United States, residing at Chicago, in the county of Cook and State of Illinois, have invented a new and useful Motor, of which the following is a specification.

My present invention relates to motors, and more particularly to such as are employed in operating phonographs and which are electrically driven.

One of the prime objects in constructing a motor for use in connection with phonographs, is to reduce to a minimum the noise of its operation caused by the vibrations of its moving parts. To secure this result, the greatest care and accuracy are exercised in alining the shafts and adjusting the bearings, but with all this, there is always present more or less vibration and hence more or less noise, and these increase during the life and use of the motor until readjustments and replacements are demanded. By reason of the nicety of adjustment of the parts of the motor being required, skilled labor of a very high degree is necessarily employed, not only in the primary construction of the motor, but in its subsequent repair; so that, the motors now found upon the market are not only unsatisfactory in operation — being noisy and but short lived — but unreasonably expensive by reason of the skilled labor required in their construction.

The principal objects, therefore, of this invention, are, to reduce the vibrations of the motor to a minimum and to accomplish this irrespective of whether the motor-shaft and power transmission shaft are accurately alined or are so maintained, thus avoiding the necessity of that nicety and accuracy of assembling these parts now so necessary, to avoid undue wear of the commutator of the motor by the brushes and, finally to automatically and continuously adjust and retain these shafts snugly in their bearings, thus still further reducing the chance of vibrations, and simplify and reduce the cost of the motor as a whole.

With these objects in view, the invention consists in details of construction and combinations of parts, all arranged as hereinafter described and particularly pointed out in the claims.

Referring to the drawing:

Figure 1 is a bottom-plan view of the baseboard of a phonograph, upon which is illustrated in inverted position, an electric motor and my improved power transmitting mechanism connected therewith;

Fig. 2 is an enlarged detail in section on the line 2—2 of Fig. 1;

Fig. 3 is a similar view on the line 3—3 of Fig. 1; and

Fig. 4 is a detail of the coiled-spring connection employed between the shafts of the motor and the power transmitting mechanism.

Similar numerals of reference indicate similar parts in all the figures of the drawing.

For the purpose of illustrating the application of my invention, I have shown the same mounted on the underside of the base-board 1, of the conventional style of phonograph, but it will be understood that the application of the invention is not limited to use in connection with phonographs, but, to the contrary, may be used wherever found desirable.

I prefer to employ a base-plate 2, of sufficient thickness to lend stability, securing the same against the under side of the base-board 1, by the usual screws 3. At that end of the base-plate adjacent the center of the base-board of the machine, I form a depending post 4, a similar post, 5, being likewise formed intermediate the base-plate. Adjacent the latter post, is formed a depending boss 6, the same being vertically bored to accommodate the record-shaft 7, which, it will be understood, projects upwardly through a hole in the base-board of the machine to a point above said board and is provided with means for detachably engaging with the usual disk for supporting the record—these parts forming no part of my invention, and, therefore, being omitted. The lower end of the record-shaft is stepped in a bearing 8, formed in a plate 9, projecting horizontally from the lower end of the intermediate post 5, and, as is usual, carries a worm-gear 10, fixed upon the shaft 7.

The two posts, described as depending from the base-plate 2, are provided with bearing-openings 11 and 12 respectively, such bearings being in alinement, and within these bearings, supported therein in a manner hereinafter described, is the horizontal governor-shaft 13, disposed at a rightangle to the vertical record-shaft 7 and adjacent thereto.

As usual, the governor-shaft is provided at its outer end, adjacent the depending post 4, with a fixed collar or boss 14, and a short distance in advance of the latter with a sliding collar 15, the two collars being connected at intervals by flat springs 16, each carrying a weight 17, so that, as will be apparent, when the governor-shaft is revolved, centrifugal force will tend to throw the weights outward and the collar 14 being fixed, the sliding collar 15 will be drawn by the flat springs toward the fixed collar, said springs flexing or bowing to a degree dependent upon the speed of rotation of the shaft. The sliding collar 15, carries a friction-disk 17$^a$ so that the latter moves with said collar.

A bell-crank lever 18, is pivoted or fulcrumed, as at 19, upon a depending post 20, one of the arms of the said bell-crank lever extending along the underside of the baseboard 1 of the machine where it is loosely engaged with the lower end of the usual swiveled speed-regulating shaft which, it will be understood, is swiveled in the baseboard 1, terminates above the same in an operating head or knob and is provided with an indicator movable over a dial divided into degrees and serving to guide the operator in securing proper speed for playing the record. The opposite or depending end of the bell-crank lever carries a friction-head 22, usually formed of felt, and the same is positioned adjacent to the friction-disk 17$^a$. This, it will be understood, is but the conventional construction and method for securing the proper tempo or time, and as it constitutes no part of my invention, no additional description is required.

The outer end of the governor-shaft may be journaled in the depending post 4 in any desired manner, but I prefer (as shown in Fig. 3) to provide said shaft with a reduced bearing-end 23, which latter enters a corresponding bore 24, formed in a plug 25, fitted in the bearing-opening of the post. To retain the plug 25 in position in the bearing-opening aforesaid, a set-screw 26, may be positioned in the post transversely to the bearing-opening and adapted at its inner end to engage the said plug.

The opposite or inner end of the governor-shaft, immediately back of its extremity, is formed with a conical bearing-collar 28, and the bearing opening in the depending post or standard 5 may be correspondingly shaped, but I prefer to secure to the inner face of the post or standard mentioned, immediately over the bearing-opening therein, a bearing-plate 28$^a$, forming in said plate a conical bearing-opening 30 corresponding to the bearing of the shaft and through which the end of the shaft projects into the bearing opening in the post 5. This plate, it will be understood, is formed of some suitable metal or bearing material, such, for instance, as phosphor-bronze. By withdrawing the plug 25, after first easing the set-screw 26, it will be obvious the governor shaft can be removed from the frame, or with the same facility it can be mounted in position. As is usual, motion from the governor-shaft is transmitted to the record-shaft by means of a worm 31, with which the said shaft is provided, gearing with the worm-gear 10.

The power transmitting mechanism described, it will be appreciated, contains but few parts, such being compactly arranged and combined and capable of ready assemblage.

Upon that portion of the base-plate 2 of the frame-work of the motor that extends beyond the intermediate post or depending standard 5, is mounted the base 32, of an ordinary electrical motor 33, the current to which may be supplied from any suitable source through the leads 34, connected with the binding-posts 35. For the purpose of retaining the motor upon the base, ordinary screws 36 may pass through the base of the motor and into the base-plate of the frame.

From the motor 33 projects the motor-shaft 37, which latter it has heretofore been essential to aline most accurately with the end of the governor-shaft, and not only that, but to make such alinement between the two shafts as nearly permanent as possible; but, as heretofore stated, regardless of the care exercised in making this connection and in alining the motor-shaft with the governor-shaft, accurate alinement and its maintenance has proved impracticable, so that as a result, more or less vibrations have inevitably occurred and these have increased in violence as the use of the machine continued, necessitating frequent readjustment of the parts in order to decrease the noise emanating from the motor. By my invention, however, as will be readily seen, I not only, as heretofore stated, obviate the necessity of accurately alining the motor-shaft and governor-shaft in the first instance, but, also the necessity of any further attention to these parts, the fact of them alining or not being one of no moment whatever and not causing vibrations and noise.

The motor-shaft and the governor-shaft are preferably, though not necessarily, of the same diameter, and they terminate adjacent in more or less alinement, no accuracy in this respect being required.

Connecting the ends of these two shafts, is a flexible, tubular coupling 38, formed of continuous coils of spring-wire, the internal diameter of said coupling approximately agreeing with the external diameters of said shafts or slightly less, so that when the ends of the coupling are slipped over the ends of the shafts, friction between the latter and the coupling will be sufficient to retain these parts thus connected. There being no other means of connection between the shafts and the coupling, it will be evident said coupling may be removed and replaced with no labor whatever. A detail of this coupling may be seen in Fig. 4 of the drawing.

When the current is switched on and the shaft of the motor rotated, the flexible coiled spring-wire coupling 38 is slightly twisted, thus causing those coils embracing the ends of the two shafts to tighten thereon, so that the rotations of the motor-shaft are transmitted to the governor-shaft, and from the latter, through its worm, to the worm-gear of the record-shaft. Thus it will be seen the power from the motor is transmitted directly and without the use of intermediate gearing to the governor-shaft. When the flexible coiled coupling is thus slightly twisted, it has a tendency to contract, so that, as a result, this contraction, slight as it is, tends to draw the shafts of the motor and governor together, causing each to seek and center itself in its respective bearing where it is maintained during the time the motor is in operation. Thus, it will be seen, the governor and motor-shafts are always drawn snugly into their bearings, so that, the bearing being true, no vibrations will result from rotations. It will be noted that the spring coupling permits the armature-shaft to float, to a certain extent, back and forth in the bearings, thus allowing the armature to find its magnetic center and also preventing the brushes from wearing grooves in the commutator, as would be the case if the shaft is supported permanently in a fixed position. It will be obvious that no great degree of accuracy or nicety is required in assembling the parts, that is, mounting the motor upon the base-plate of the transmission frame-work, as regardless of inaccuracies in this respect, the power will be delivered by the motor-shaft to the governor-shaft direct and without vibrations. The result is that an exceedingly quiet motor and transmission mechanism is secured. The parts of the transmission, it will be seen are comparatively few, no intermediary gearing being employed between the motor and the governor shaft, hence it is that the entire plant can be produced at a comparatively low price.

Having described my invention, what I claim, is:

1. The combination with a driving and a driven shaft, one of which is provided with a thrust-bearing, a companion bearing for receiving said thrust-bearing, and a coiled wire coupling connecting the ends of the two shafts, whereby when the driving-shaft is rotated said coiled wire coupling will tend to contract and draw the thrust-bearing into and center it in the said companion bearing.

2. The combination with a driven and a driving-shaft, the ends of which are spaced apart and approximately aline, of a bearing-collar on one of said shafts near its end and provided with a conical bearing-surface, a tapered bearing for receiving said bearing-collar, and a coiled-wire coupling connecting the ends of the two shafts beyond said bearing, whereby, when the driving-shaft is rotated the coiled-wire coupling will automatically contract and draw the conical bearing-collar into the tapered bearing therefor.

3. In a motor, the combination with a base-plate, opposite posts projecting therefrom and provided with alining bearing-openings, of a bored plug seated in the outer post, a conical bearing formed in the companion post, a shaft reduced at its outer end to enter the bore of the plug and near its opposite end having a conical bearing-collar fitting the conical bearing of the companion post, a motor, the shaft of which approximately alines with the first mentioned shaft, and a tubular spring-wire coupling engaging the ends of the two shafts, whereby, when said motor-shaft is rotated, the first mentioned shaft is drawn toward the motor by the twisting of said coupling and caused to snugly fit and center itself in its said conical bearing.

4. In combination, a pair of rotary shafts one of which is provided with a thrust-bearing, a companion bearing coacting with said thrust-bearing, and a flexible member connecting the ends of said shafts, whereby when one of said shafts is rotated said member tends to contract and to draw said thrust-bearing toward and center it upon said companion bearing.

5. In combination, a pair of substantially alined rotary shafts one of which is provided with a thrust element, a centering element engageable with said thrust element, and an automatically contractible coupling connecting the ends of said shafts, whereby when one of said shafts is rotated said coupling tends to relatively displace said thrust and centering elements and to aline said shafts.

6. In combination, a pair of substantially alined rotary members one of which is provided with a thrust-bearing, a companion bearing coacting with said thrust-bearing, and a flexible coupling connecting said members, whereby when one of said members is rotated said coupling contracts and draws said thrust-bearing into center position upon said companion bearing.

7. In combination, a pair of substantially alined rotary shafts, a coupling connecting said shafts, said coupling being formed to automatically move one of said shafts endwise when the other of said shafts is rotated, and automatic centering means coacting with said endwise movable shaft.

8. In combination, a pair of substantially alined rotary shafts, a flexible tubular coupling connecting said shafts, said coupling being formed to contract and to move one of said shafts toward the other when rotation is imparted to said shafts, and means operable during contraction of said coupling to automatically center said shafts.

GEO. C. TROTTER.